(12) United States Patent
Coffey et al.

(10) Patent No.: US 8,717,594 B2
(45) Date of Patent: May 6, 2014

(54) SYSTEM FOR MONITORING AND MODIFYING OPERATION OF AN ELECTRICAL ENERGY CONSUMING DEVICE CORRESPONDING TO ELECTRICAL ENERGY CONSUMPTION

(71) Applicant: Xerox Corporation, Norwalk, CT (US)

(72) Inventors: David F. Coffey, Portland, OR (US); Brent R. Jones, King City, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/918,217

(22) Filed: Jun. 14, 2013

(65) Prior Publication Data

US 2013/0278962 A1 Oct. 24, 2013

Related U.S. Application Data

(62) Division of application No. 12/815,943, filed on Jun. 15, 2010.

(51) Int. Cl.
*G06K 15/00* (2006.01)
*G06F 3/12* (2006.01)
*H04N 1/60* (2006.01)
*H04N 1/46* (2006.01)

(52) U.S. Cl.
USPC .......... 358/1.14; 358/1.15; 358/1.9; 358/501; 358/502

(58) Field of Classification Search
USPC .............. 358/1.14, 1.15, 1.13, 1.9, 1.12, 502, 358/501, 419, 420, 421, 422; 713/320, 323, 713/340, 310, 321, 347, 17, 1, 6, 102, 19, 713/14, 99, 88, 171; 399/88, 37, 70, 89, 90
See application file for complete search history.

(56) References Cited

U.S. PATENT DOCUMENTS

| | | |
|---|---|---|
| 4,120,031 A | 10/1978 | Kincheloe et al. |
| 4,644,320 A | 2/1987 | Carr et al. |
| 5,237,507 A | 8/1993 | Chasek |
| 5,627,759 A | 5/1997 | Bearden et al. |
| 5,717,609 A | 2/1998 | Packa et al. |
| 5,811,966 A | 9/1998 | Lee |
| 5,818,725 A | 10/1998 | McNamara et al. |
| 5,875,430 A | 2/1999 | Koether |
| 5,880,677 A | 3/1999 | Lestician |
| 6,148,623 A | 11/2000 | Park et al. |
| 6,389,544 B1 | 5/2002 | Katagiri |
| 6,476,728 B1 | 11/2002 | Sakakibara |
| 6,546,294 B1 | 4/2003 | Kelsey et al. |
| 6,552,525 B2 | 4/2003 | Bessler |
| 6,633,823 B2 | 10/2003 | Bartone et al. |
| 6,751,563 B2 | 6/2004 | Spanier et al. |
| 6,792,337 B2 | 9/2004 | Blackett et al. |

(Continued)

*Primary Examiner* — Ngon Nguyen
(74) *Attorney, Agent, or Firm* — Maginot, Moore & Beck, LLP

(57) ABSTRACT

A system adjusts at least one operational parameter for at least one electrical energy consuming device. The system monitors electrical energy consumption measurements for operational activity periods, identifies an electrical energy consumption measurement difference between an electrical energy consumption measurement for an operational activity period and an electrical energy consumption measurement for a corresponding operational activity period, and modifies an operational parameter for the electrical energy consuming device in response to the difference being greater than a predetermined threshold. The modified operational parameter is sent to the electrical energy consuming device to enable modified operation of the electrical energy consuming device.

9 Claims, 5 Drawing Sheets

(56) References Cited

U.S. PATENT DOCUMENTS

| | | |
|---|---|---|
| 6,906,617 B1 | 6/2005 | Van der Meulen |
| 6,928,564 B2 | 8/2005 | Tada et al. |
| 6,934,862 B2 | 8/2005 | Sharood et al. |
| 6,986,069 B2 | 1/2006 | Oehler et al. |
| 7,099,785 B2 | 8/2006 | Lee et al. |
| 7,103,787 B2 | 9/2006 | Cantwell |
| 7,209,804 B2 | 4/2007 | Curt et al. |
| 7,254,497 B2 | 8/2007 | Downey et al. |
| 7,324,006 B2 | 1/2008 | Godard |
| 7,423,546 B1 | 9/2008 | Aisa |
| 7,463,986 B2 | 12/2008 | Hayes |
| 7,467,311 B2 | 12/2008 | Bahali et al. |
| 7,495,431 B2 | 2/2009 | Sun et al. |
| 7,517,075 B2 * | 4/2009 | Smith et al. .................. 347/102 |
| 7,554,320 B2 | 6/2009 | Kagan |
| 7,617,406 B2 | 11/2009 | Yasuo |
| 2002/0144162 A1 * | 10/2002 | Tada et al. ..................... 713/300 |
| 2004/0003303 A1 | 1/2004 | Oehler et al. |
| 2004/0246512 A1 | 12/2004 | Miyamoto |
| 2005/0116836 A1 | 6/2005 | Perry et al. |
| 2005/0116982 A1 | 6/2005 | Nakazawa |
| 2005/0231758 A1 | 10/2005 | Reynolds |
| 2007/0094527 A1 | 4/2007 | Frietsch et al. |
| 2008/0107443 A1 * | 5/2008 | Snyder ............................ 399/88 |
| 2008/0109663 A1 * | 5/2008 | Snyder et al. ................. 713/300 |
| 2009/0222338 A1 | 9/2009 | Hamilton, II et al. |
| 2009/0225124 A1 * | 9/2009 | Snyder et al. ................... 347/17 |
| 2009/0313493 A1 | 12/2009 | Ide |
| 2010/0134834 A1 | 6/2010 | Nishikawa |
| 2010/0188262 A1 | 7/2010 | Reymann et al. |
| 2010/0235656 A1 | 9/2010 | Murata |

* cited by examiner

SYSTEM FOR MONITORING AND MODIFYING OPERATION OF AN ELECTRICAL ENERGY CONSUMING DEVICE CORRESPONDING TO ELECTRICAL ENERGY CONSUMPTION

CLAIM OF PRIORITY

This application claims priority to and is a divisional application of U.S. patent application Ser. No. 12/815,943, which is entitled "System And Printing Device For Monitoring and Modifying Operation Of A Printing Device Corresponding To Electrical Energy Consumption," which was filed on Jun. 15, 2010 and which issued as U.S. Pat. No. 8,570,564 on Oct. 29, 2013.

TECHNICAL FIELD

This disclosure relates to the field of printing systems, and more particularly, to a system that adjusts an operational parameter of a printing device after monitoring electrical energy usage of the printing device.

BACKGROUND

Various types of imaging devices are commonly used in industry to form images on print media such as paper. Common examples of imaging devices are printing devices including laser printers, LED printers, and drop-on-demand ink printers, such as inkjet printers employing aqueous or phase change inks. While these various printing devices may employ different techniques to form images on print media, common printing devices typically consume electrical energy when activated. Electrical energy is consumed at varying rates during imaging operations, during printer maintenance operations, and also during periods of inactivity between imaging operations. Different classes of printing device may consume different amounts of electricity depending upon various factors including how many sheets of print media each printing device images during a given time period.

The cost of electrical energy is one component in the overall cost of using a printing device. When comparing different printing devices, a disparity in electrical energy consumption between different printing systems may make a particular printing device appear to be less economical to operate. However, printing devices that consume additional electrical energy may be more efficient in other areas, including having improved throughput, colorant usage, and image quality. Additionally, the overall energy efficiency of a printing system may include factors that offset the reduced efficiency caused by the printing system consuming a moderately greater amount of electrical energy in operation. A printing system that produces comparatively less waste material may consume less overall energy during the printing system's lifetime, and solid ink printers have this advantage over other common printing systems. However, these advantages in energy efficiency are less visible than a direct measurement of operational electrical energy consumption. Thus, operating printing devices in a manner that reduces visible cost disparities due to electrical energy consumption improves the efficiency of operating printing devices and benefits the field of printing.

SUMMARY

A system adjusts at least one operational parameter for at least one electrical energy consuming device. The system includes a communication port configured to receive electrical energy consumption measurements for operational activity periods from at least one electrical energy consuming device, and a controller communicatively connected to the communication port to receive the electrical energy consumption measurements for operational activity periods from each electrical energy consuming device communicatively connected to the communication port, the controller being configured to identify an electrical energy consumption measurement difference between an electrical energy consumption measurement for an operational activity period that was received from a first electrical energy consuming device and an electrical energy consumption measurement for a corresponding operational activity period that was stored in memory communicatively connected to the controller, and the controller being configured to modify an operational parameter for the first electrical energy consuming device in response to the difference being greater than a predetermined threshold and to communicate the modified operational parameter to the first electrical energy consuming device through the communication port to enable modified operation of the first electrical energy consuming device.

A printing device provides the system that modifies operational parameters with electrical energy consumption measurements that are used to modify the operational parameters. The printing device includes an electrical power supply, an electrical power measuring circuit operatively connected to the electrical power supply and configured to measure electrical power usage of the electrical power supply, a communication port, and a printer controller operatively coupled to the electrical power measuring circuit and the communication port, the printer controller configured to receive a measurement of electrical energy usage during a predetermined time period from the electrical power measuring circuit, to identify an operational activity period for the electrical usage measurement, and to communicate the electrical energy usage measurement for the operational activity period to a monitoring system through the communication port.

DETAIL DESCRIPTION

Figure 1:
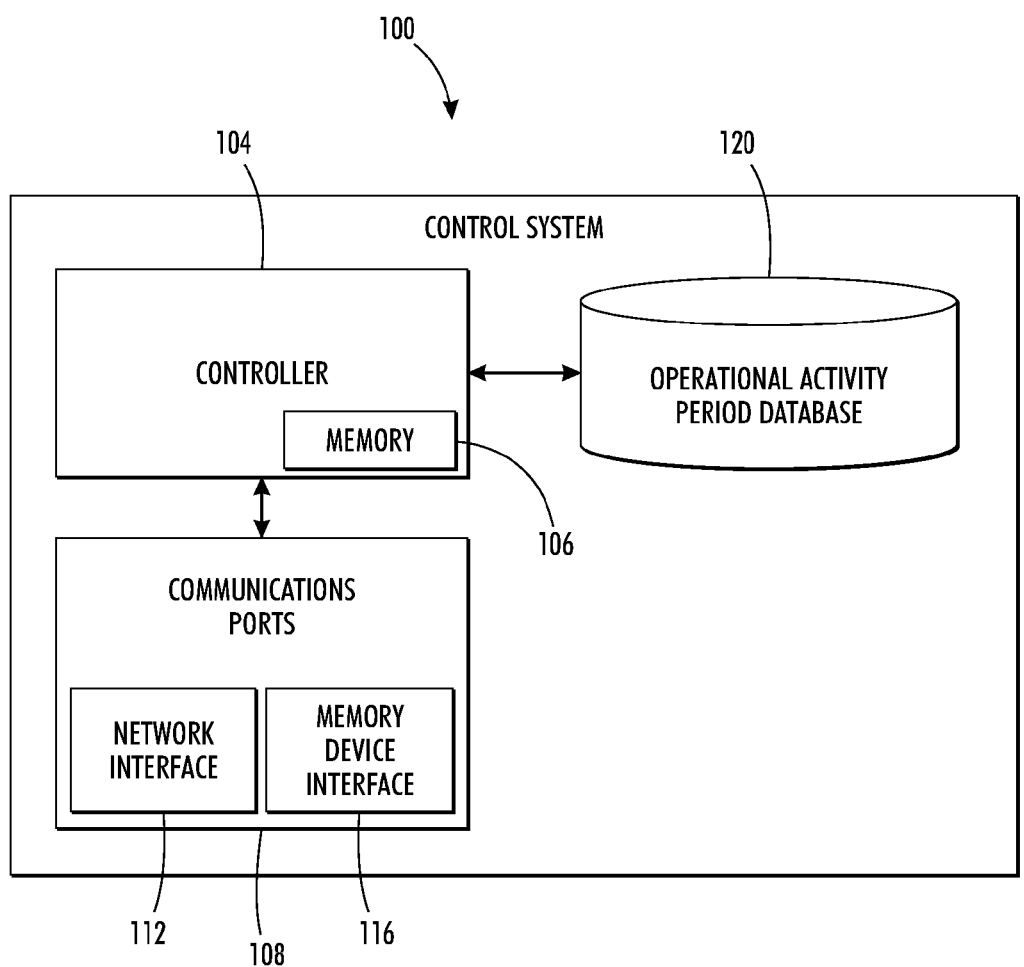
FIG. 1 is a schematic diagram of a control system suitable for monitoring and modifying operational parameters of one or more printing devices.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, or the like. The description presented below is directed to a printing system that monitors its electrical energy consumption over time, reports the electrical energy usage to a control system, and adjusts an operational parameter in response to instructions received by the control system. The instructions may be generated automatically based on predetermined criteria configured in the control system, or through manual input into the control system based on energy consumption information and comparative data forming the basis for recommended operational adjustments. As used herein, "control system" refers to a computing device or combination of computing devices configured to receive and process energy usage measurements generated by one or more printing devices, to compare the energy usage measurements to predetermined energy usage thresholds stored in a memory, and to generate an instruction that a printing device follows to adjust an operational parameter. The term "comparative energy consumption" as used herein refers either to an estimate of energy consumption for an alternative printing device having comparable performance to the printer being monitored by the control system, or to a measurement of actual energy consumption for either the alternative device or the monitored printing device during a known time period. The form of energy consumed is typically electrical energy, although thermal, mechanical, or chemical energy consumption may be compared as well. A "comparative energy consumption record" refers to a machine readable data representation of a comparative energy consumption measurement or estimate. Comparative energy consumption records of alternative printing devices may be recorded and stored in a data storage device operatively coupled to the control system for later retrieval.

A schematic block diagram of an embodiment of a control system 100 is depicted in FIG. 1. Control system 100 includes a controller 104 that is configured to send and receive data with a communication port 108 and to store and read information from operational activity database 120. Typical embodiments of controller 104 include a microprocessing device such as a central processing unit (CPU), an application specific integrated circuit (ASIC), a field programmable device, or a microcontroller. Controller 104 is further configured to run a plurality of commands encoded in software stored in a memory 106. Communication ports include a network interface 112 and a memory device interface 116. Examples of network interfaces include wired network interfaces, such as Ethernet network interfaces or dial-up modem interfaces. Alternatively, the network interface may be wireless including a wireless transceiver employing the IEEE 802.11 family of protocols, or a 3G or 4G wide area network transceiver. Network interface 112 is configured to send and receive data from one or more printing devices using a data communications network, with typical examples of data communications networks including packet switched networks, such as a local area network (LAN) or wide area network (WAN) employing an Internet Protocol (IP) based communication scheme. Another communication port is memory device interface 116. Memory device interface 116 places a removable data storage device in communication with controller 104 when the removable data storage device is connected to memory device interface 116. Common examples of a memory device interface include a universal serial bus (USB) port, an IEEE 1394 port, a floppy disk drive, an optical drive such as a CD-ROM or DVD-ROM drive, an external Serial Advanced Technology Attachment (eSATA) port, a media card reader such as a Secure Digital (SD) card reader, or a wireless interface such as a Bluetooth interface adapted to communicate with a data storage device.

Operational activity database 120 is a data storage device configured to store a plurality of comparative energy consumption records corresponding to operational activity periods of one or more printing devices during a predetermined time period. An example operational activity period refers to a printing device that prints 1,500 pages during a seven day period. This operational activity period corresponds to an amount of electrical energy that the device consumes during a seven day period given that it is printing 1,500 pages. An alternative operational activity period measures an amount of colorant used during a predetermined time period. Other factors suitable for use in measuring operational activity periods include a number of images or the total pixel count generated by the device during a time period. The records in operational activity database 120 may refer to a second printing device employing a different printing technique than the printing devices placed in communication with control system 100. For example, if a group of solid-ink printing devices were being monitored by control system 100, their measured power usage may be compared to power usage estimates or recorded measurements of a laser printer having a configuration and level of operational use similar to those of the solid-ink printing devices. The activity profiles in operational activity database 120 may also refer to a second configuration of the printing devices placed in communication with control system 100. For example, one operational activity period may include printing 1,500 pages during a seven day period where the pages are printed in a lower "draft" quality mode, while another operational activity period corresponds to printing the same number of pages in a high-quality mode. The operational activity periods for each configuration may have a different associated energy usage estimate or measurement.

Figure 2:
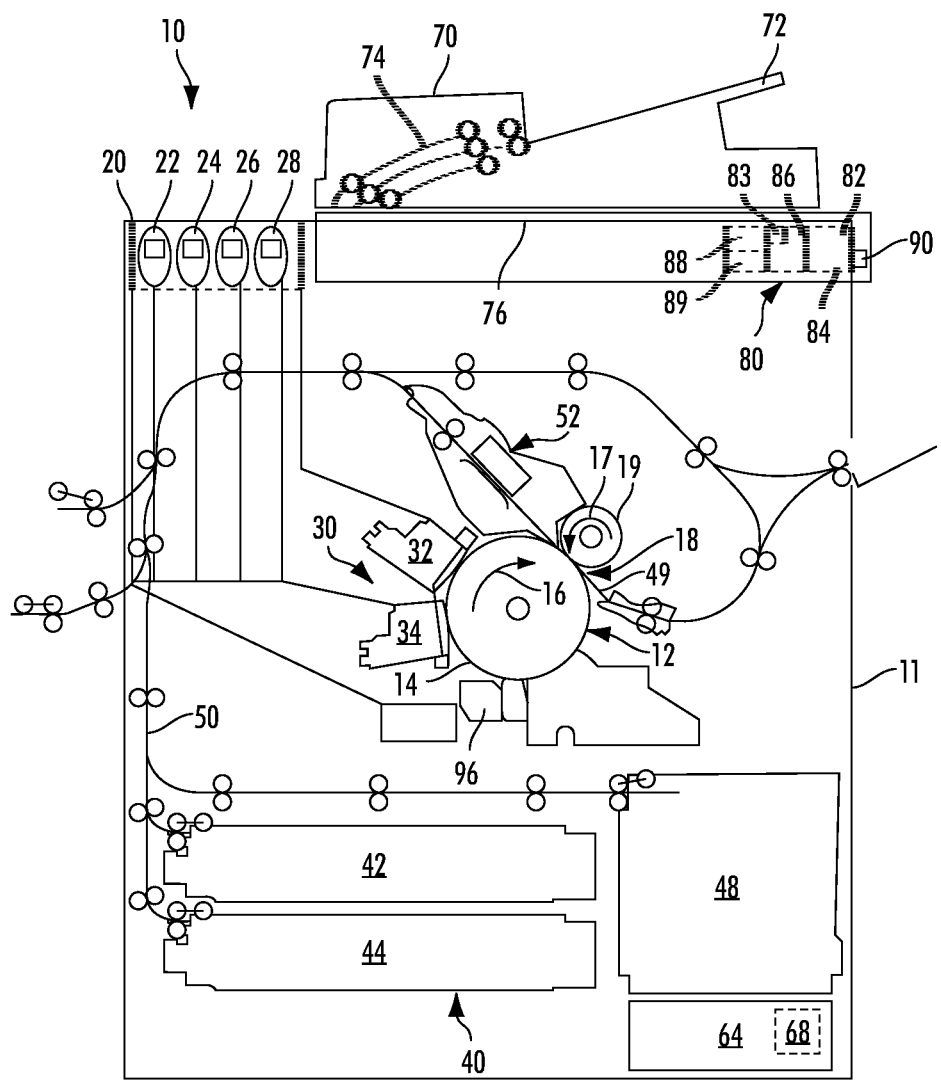
FIG. 2 is a schematic diagram of a printing device configured to communicate with a control system.

Referring now to FIG. 2, an embodiment of an imaging device, such as a high-speed phase change ink image printing device or printer 10, is depicted. As illustrated, printing device 10 includes a frame 11 to which are mounted directly or indirectly all its operational subsystems and components, as described below. To start, the high-speed phase change ink image printing device 10 includes an image receiving member 12 that is shown in the form of a drum, but can equally be in the form of a supported endless belt. The image receiving member 12 has an imaging surface 14 that is movable in the direction 16, and on which phase change ink images are formed. A transfix roller 19 rotatable in the direction 17 is loaded against the surface 14 of drum 12 to form a transfix nip 18, within which ink images formed on the surface 14 are transfixed onto a heated media sheet 49.

The high-speed phase change ink image printing device 10 also includes a phase change ink delivery subsystem 20 that has at least one source 22 of one color phase change ink in solid form. The example phase change ink image printing device or printer 10 is a multicolor image printing device. The ink delivery system 20 includes four (4) sources 22, 24, 26, 28, representing four (4) different colors CMYK (cyan, magenta, yellow, black) of phase change inks. The phase change ink delivery system also includes a melting and control apparatus (not shown) for melting the solid form of the phase change ink into a liquid form. The phase change ink delivery system is suitable for supplying the liquid form to a printhead system 30 including at least one printhead assembly 32. Printing device 10 is a wide format high-speed, or high throughput, multicolor image printing device. The printhead system 30 includes multiple multicolor ink printhead assemblies, 32 and 34 as shown. In the embodiment illustrated, each printhead assembly further consists of two independent printheads. The total number of four printheads is staggered so that the array of printheads covers substantially the full imaging width of the largest intended media size. Solid ink printers may have one or any number of any size printheads that may jet any number of ink colors and may be arranged in any practical manner.

As further shown, the phase change ink image producing device or printer 10 includes a substrate supply and handling system 40. The substrate supply and handling system 40, for example, may include sheet or substrate supply sources 42, 44, 48, of which supply source 48, for example, is a high capacity paper supply or feeder for storing and supplying image receiving substrates in the form of cut sheets 49, for example. The substrate supply and handling system 40 also includes a substrate handling and treatment system 50 that has a substrate heater or pre-heater assembly 52. The phase change ink image producing device or printer 10 as shown may also include an original document feeder 70 that has a document holding tray 72, document sheet feeding and retrieval devices 74, and a document exposure and scanning system 76.

Operation and control of the various subsystems, components and functions of the printing device 10 are performed with the aid of a controller or electronic subsystem (ESS) 80. The ESS or controller 80, for example, is a self-contained, dedicated mini-computer having a central processor unit (CPU) 82 with electronic storage 84, and a display or user interface (UI) 86. The ESS or controller 80, for example, includes two communication ports, network interface port 88 and memory interface port 89. Controller 80 also includes sensor interface 83 that is configured to receive electrical energy consumption levels generated by power measurement circuit 68. In addition, the CPU 82 reads, captures, prepares, and manages the image data flow between image input sources, such as the scanning system 76, or an online or a work station connection 90, and the print head assemblies 32 and 34. As such, the ESS or controller 80 is the main multitasking processor for operating and controlling all of the other machine subsystems and functions, including the duplex printing process discussed below.

The controller 80 may be implemented with general or specialized programmable processors that execute programmed instructions. The instructions and data required to perform the programmed functions may be stored in memory associated with the processors or controllers. The processors, their memories, and interface circuitry configure the controllers to perform the processes, described more fully below, that enable the image receiving member 12 to continue to rotate during some duplex printing operations. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Multiple controllers configured to communication with the main controller 80 may also be used.

The controller is coupled to an actuator 96 that rotates the image receiving member. The actuator may be an electric motor that the controller may operate at multiple speeds and also halt to carry out a printing process sequence. The controller of the present embodiment also generates signals for operating the components that position the transfix roller and the release agent applicator with reference to the image receiving member.

The various subsystems, components, and functions of the printing device 10 consume electrical energy in operation. Electrical power supply 64 provides electrical energy to printing device 10 at an appropriate voltage and amperage level. Electrical power supply 64 is typically configured to connect to an external source of electrical alternating current (AC), which electrical power supply 64 converts to direct current (DC) electricity consumed by various subsystems and components in the printer. Electrical power supplies that are commonly found in printing devices include switched-mode power supplies. An electrical power measurement circuit 68 is electrically connected to electrical power supply 64. Electrical power measurement circuit 68 is configured to measure the instantaneous electrical power usage of electrical power supply 64, and electrical power measurement circuit 68 is further configured to transmit the measurements to controller 80 via sensor interface 83.

In operation, image data for an image to be produced are sent to the controller 80 from either the scanning system 76 or via the online or work station connection 90 for processing and output to the printhead assemblies 32 and 34. Additionally, the controller determines and/or accepts related subsystem and component controls, for example, from operator inputs via the user interface 86, and accordingly executes such controls. As a result, appropriate solid forms of differently colored phase change ink are melted and delivered to the printhead assemblies. Additionally, inkjet control is exercised with the generation and delivery of firing signals to the print head assemblies to form images on the imaging surface 14 that correspond with the image data. Media substrates are supplied by any one of the sources 42, 44, 48 and handled by substrate system 50 in timed registration with image formation on the surface 14. The timing of the transporting of the media sheets to the nip, the regulation of the rotation speed for the image receiving member, and the positioning of the transfix member and release agent applicator are performed by the processes described above for appropriate printing operations. After an image is fixedly fused to an image substrate, the image bearing substrate is delivered to an output area.

During operation, controller 80 collects power consumption measurements from electrical power measurement circuit 68 via sensor interface 83. Controller 80 identifies the electrical energy consumption of the printing device for an operational activity period during a predetermined time period from the collected power consumption measurements. Controller 80 also records an operational activity period that includes the number of media sheets imaged and the quantity of solid ink consumed during the predetermined time period. Controller 80 periodically sends the energy consumption for a corresponding operational activity period to a control system using either or both of network interface port 88 and memory interface port 89. Controller 80 is also configured to receive modified operational parameter from the network interface port 88 and memory interface 89. Additionally, controller 80 is configured to receive reports identifying a difference between the measured electrical power consumption for an operational activity period of the printing device 10 and an electrical energy consumption measurement for a corresponding operational activity period sent from the control system. This difference may be reproduced on display 86 or otherwise be made available for inspection by a printer operator.

Figure 3:
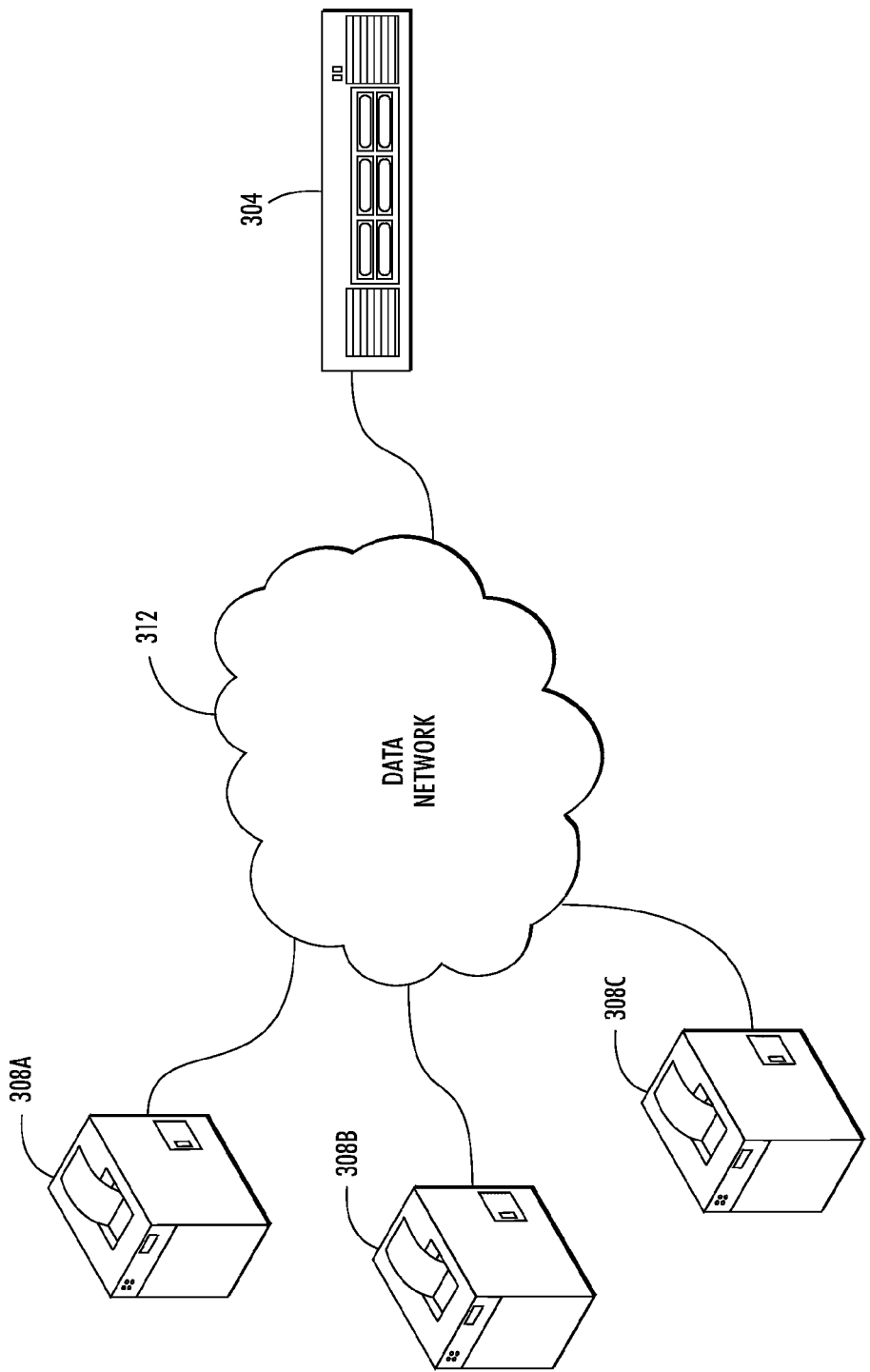
FIG. 3 is a schematic diagram of multiple printing devices communicatively coupled to a control system via a data communications network.

A depiction of a control system placed in communication with multiple printing devices is depicted in FIG. 3. Control system 304 is communicatively coupled to printing devices 308A-308C using data communications network 312. Data communications network 312 is typically a local area or wide area network employing an internet protocol (IP) communication scheme, although alternative embodiments including communicating via modems over a circuit-switched telephony network are also envisioned. Control system 304 includes a network interface port allowing the control system to send and receive data via data communications network 312. Each of the printing devices 308A-308C has a corresponding network interface port configured to send and receive data via data communications network 312. Electrical energy consumption measurements for operational activity periods are sent from each of printing devices 308A-308C to control system 304, and control system 304 compares the energy consumption measurements for operational activity periods to electrical energy consumption measurements for corresponding operational activity periods stored in an internal database that is communicatively connected to the controller. Control system 304 may send instructions modifying operational parameters to each of printing devices 308A-308C via data network 312. In the example of FIG. 3, printing devices 308A-308C may be multiple instances of the same printing device design, or may be printing devices having different designs and operational modes.

Figure 4:
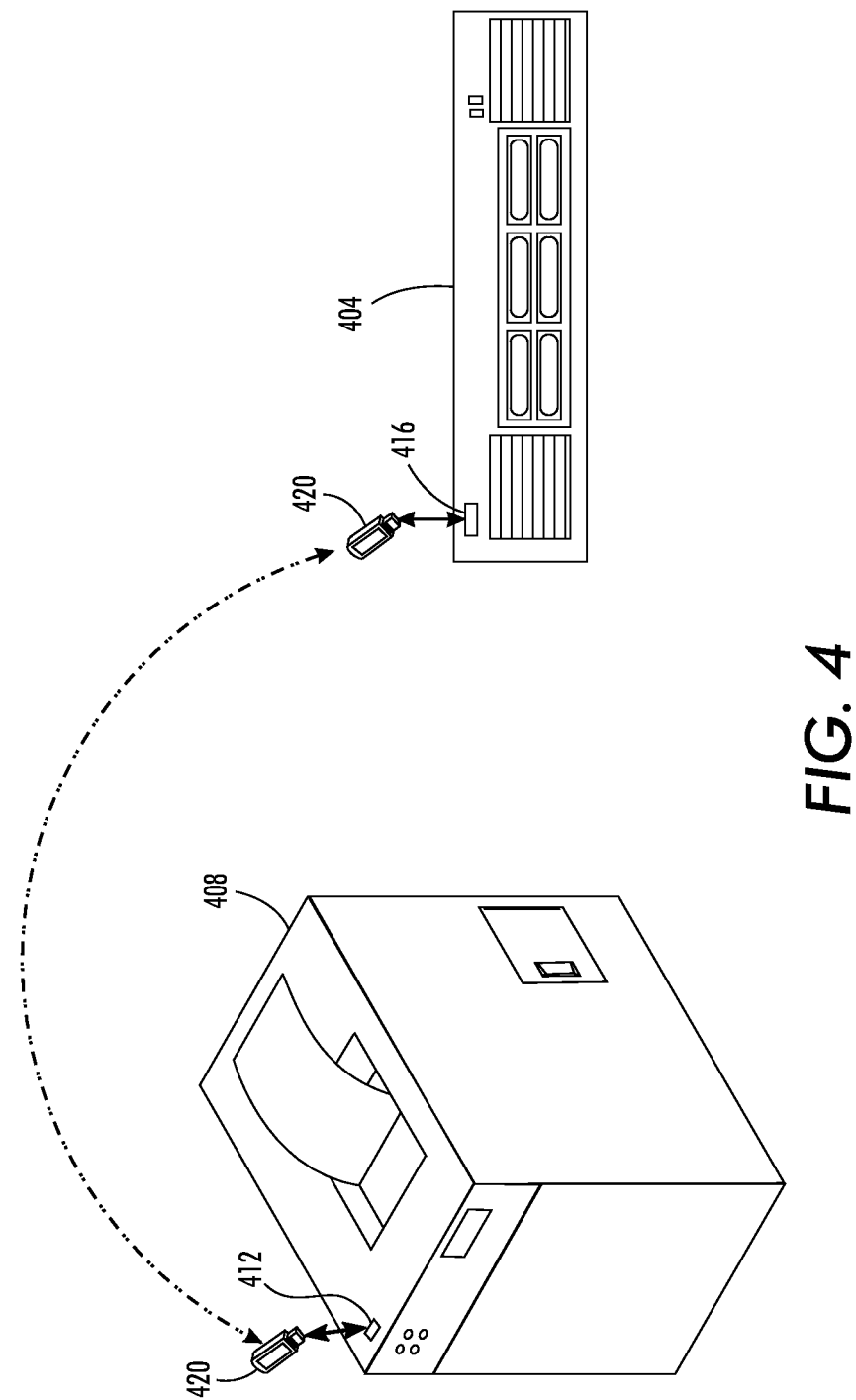
FIG. 4 is a schematic diagram of a printing device communicatively coupled to a control system via a memory device.

An alternative arrangement of a control system and a printing device is depicted in FIG. 4. In FIG. 4, printing device 408 and control system 404 are not configured to communicate with one another using a data network. This configuration may occur for several reasons, including when printing device 408 is operated in a high-security environment where access to external data networks is restricted, or for printing devices that are not equipped with a network interface port. Printer 408 includes a memory device interface 412, and control system 404 includes a compatible memory device interface 416. Memory device ports 412 and 416 are both configured to connect to a common memory device 420. Memory device 420 is a removable device configured to connect to either printing device 408 or control system 404. When memory device 420 is connected to printing device 408, the printing device writes electrical energy usage measurements for operational activity periods to the storage device. Printing device 408 also reads any instructions held in memory device 420 directing printing device 408 to modify one or more operational parameters. When memory device 420 is connected to control system 404, the control system reads electrical energy usage measurements for operational activity periods previously written by printing device 408. Control system 404 may also generate and store instructions for printing device 408 directing printing device 408 to modify one or more operational parameters. In the example of FIG. 4, memory device 420 is a solid-state data portable storage device employing NAND flash memory and a Universal Serial Bus (USB) connector. The USB connector of memory device 420 corresponds to USB ports 412 and 416 of control system 404 and printing device 408, respectively. However, alternative embodiments of memory device 420 include portable hard drives, solid state memory cards such as SD cards, optical media including CDs and DVDs data disks, magnetic disks, and other removable data storage devices. Alternative memory device ports 412 and 416 may be configured to accommodate the various memory storage devices described above. An operator physically transports and connects memory storage device 420 to control system 404 and printing device 408.

Figure 5:
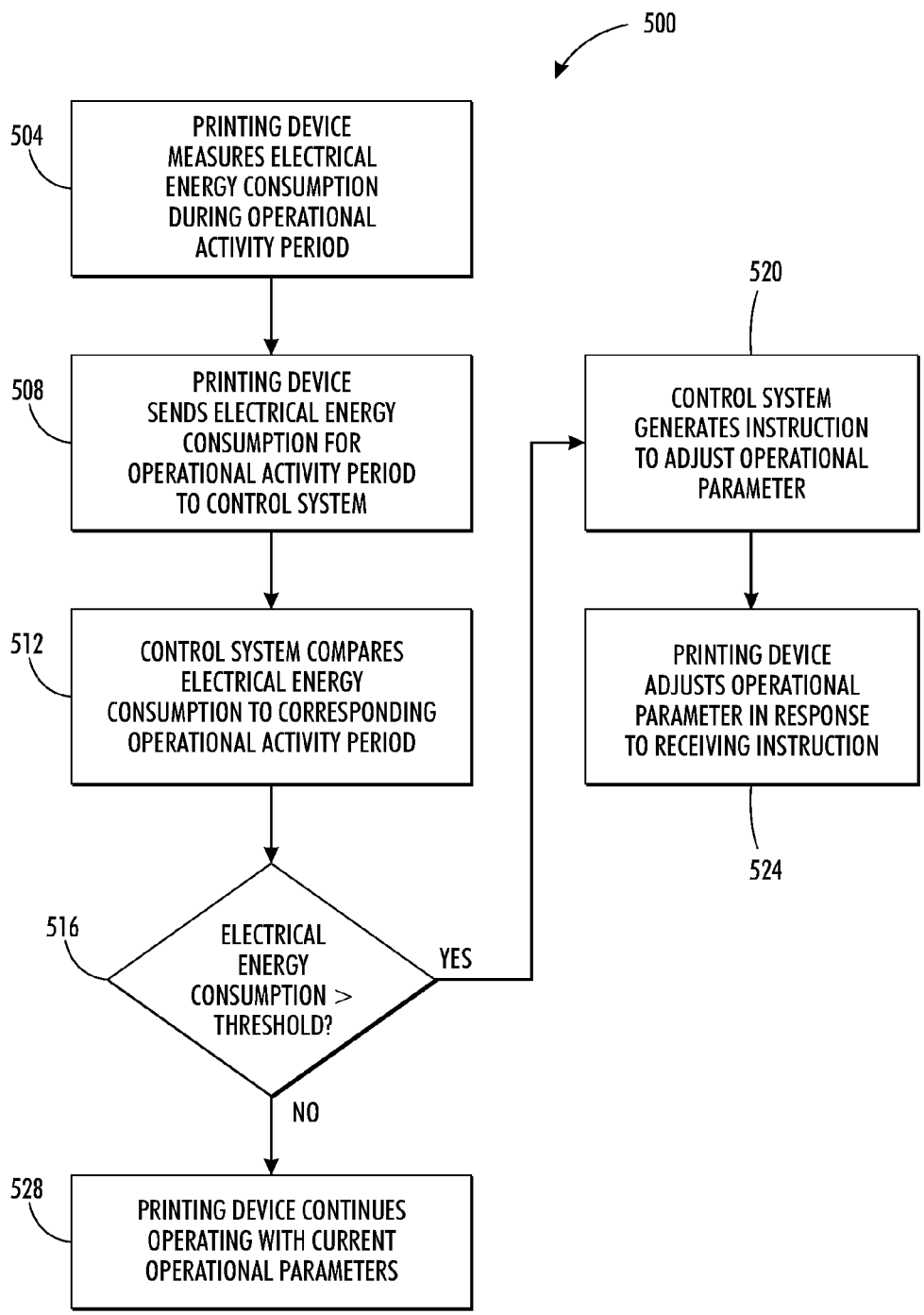
FIG. 5 is a block diagram of a process for monitoring electrical energy usage of a printing device and for adjusting an operational parameter of the printing device.

The operation of the control system with an example printing device is depicted in FIG. 5. Process 500 begins with a printing device measuring its electrical energy consumption for an operational activity period over a predetermined period of time (block 504). Using the example printing device of FIG. 2, controller 80 receives periodic updates from electrical power sensor 68 indicating the electrical power being consumed by electrical power supply 64. The electrical energy usage for a given time period may be approximated by the average power usage multiplied by the length of the time period, which is typically expressed in units of joules, watt-hours, or kilowatt-hours. While the electrical energy usage is being measured, the operational activity period of the printing device is also being measured. The operational activity period measurements identified by the controller 80 may include the number of media sheets that are printed, and may additionally measure the amount of colorant consumed during the time period in the activity level measurement. The example printing device 10 of FIG. 2 uses one or more colors of solid ink as a colorant, but alternative colorants include aqueous ink, toner, or gel materials.

After measuring electrical energy consumption for operational activity periods for predetermined time periods, the printing device sends the electrical energy consumption measurements for the operational activity periods to the control system (block 508). As depicted in FIG. 2 and FIG. 3, the electrical energy consumption measurements for the operational activity periods may be sent via a data network, or may be recorded to a memory device, such as a portable digital storage device that is subsequently connected to a communication port in the control system. The control system then compares the measured electrical energy consumption for an operational activity period to the measurement of an earlier equivalent operational activity period for the same device, or an estimate of electrical energy consumption for a corresponding operational activity period for a different printing device (block 512). Using control system 100 of FIG. 1 as an example, controller 104 receives the electrical energy consumption for an operational activity period via network interface 112 or by reading the information from a data storage device attached to memory device interface 116. Controller 104 then references operational activity database 120 to identify an electrical energy consumption measurement for a corresponding operational activity period for a second printing device or for the monitored printing device configured with different operational parameters. If the printing device communicating with the controller is a solid ink printer, then the second printing device may be another type of printer, such as an aqueous ink printer or a laser printer. If the comparison is made with respect to a second printing device, an estimate of electrical energy consumption for a comparable operational activity period is made based on operational activity period data stored in operational activity database 120. These data may include quantification criteria such as time period, images or pixels and historical, measured or estimated energy use levels for one or more operational states. The comparative energy consumption may also be produced by measuring electrical energy consumption for the first printing device during an earlier operational activity period of equivalent time length and comparable operational activity level.

If the difference between the measured energy consumption and the comparative energy consumption identified by the control system is less than a predetermined threshold (block 516), then the printing system may continue to operate with existing operational parameters (block 528). In one embodiment the predetermined threshold may include any energy consumption measurement that exceeds the comparative energy consumption of the comparative reference device by some established level. The predetermined threshold may also be chosen as a percentage above or below the comparative energy consumption level, such as 80% or 120% of the comparative energy consumption. Still another predetermined threshold could be an absolute value of energy consumption above or below the comparative energy consumption, such as thresholds of five kilowatt-hours above or below the comparative energy consumption value. In situations where the difference in energy consumption exceeds the predetermined threshold (block 516), the control system generates an instruction for the printing device to modify one or more operational parameters (block 520). Examples of operational parameter modifications include modifying the proportion of time that a printing device spends in a low-power standby mode, instructing the printing device to shut itself off after a period of inactivity, modifying the throughput of printing operations to lower energy consumption, and adjusting the temperature of printer components, such as the temperature of a melt plate for melting ink, media preheating level, and adjusting the temperature of a transfix roller in a phase-change printer or a fuser roller in a laser printer. An alternative instruction sent from the control system directs the printing device to modify an operational cost parameter. An operational cost parameter affects the monetary cost of operating the printing device, but does not necessarily reduce the electrical power consumption of the device. A printer may modify one or more operational cost parameters including switching between duplex and simplex printing modes and printing in a lower resolution mode that uses a reduced amount of colorant per media sheet. In some printing devices, these modifications make a minimal impact on electrical energy consumption, but reduce the overall cost of operating the printing device. Another operational cost parameter modification may involve providing a reward or compensation for operating the printing device if the electrical energy usage attains an optimal level or exceeds a comparative threshold, respectively. The reward or compensation may take any suitable form, such as a direct monetary discount that is proportional to the cost of the marginal amount of electrical energy consumed beyond the predetermined threshold. Alternative reward or compensation methods provide user cost benefits such as providing complementary consumables, including colorants and media sheets, or credits for printer servicing and maintenance. The amount of the reward or compensation may be determined based on pre-established criteria, and the control system may communicate the determined amount via the memory device or data communications network described above.

Data sent from the control system to the printing device in process step 520 may additionally include the electrical energy consumption measurement for the corresponding operational activity period. Some printing devices are configured with a display mechanism such as display 86 of printer 10 in FIG. 1. The measured electrical energy consumption for an operational activity period, the electrical energy consumption measurement for the corresponding operational activity period, and the difference between the measured electrical energy consumption figures are available for viewing on display 86. An alternative mechanism for displaying the energy usage information is to have the printing device print the information on a media sheet in response to a request to produce the energy usage information.

The printing device modifies its operational parameters in response to the instruction generated by the control system (block 524). The printing device may receive the instructions using a method similar to how the printing device sends energy consumption and activity level information to the control system. In the embodiment of FIG. 3, the printing devices may receive instructions via the data network. In the embodiment of FIG. 4, the control system may record the operational parameter modification on the data storage device, and the printing device receives the instruction when the data storage device is subsequently connected to the printing device's memory device port. Once received, a controller in each printing device, such as controller 80 of FIG. 2, adjusts one or more operational parameters in response to the instructions sent by the control system.

It will be appreciated that variants of the above-disclosed and other features, and functions, or alternatives thereof, may be desirably combined into many other different systems or applications. For example, while the printing device depicted in FIG. 2 is a phase change ink image printing device, various printing devices using alternative printing techniques may also be modified to include the foregoing features. Further, while printing devices are disclosed above, electrical energy consuming devices other than printers may also be modified to include the foregoing features. Various presently unforeseen or unanticipated alternatives, modifications, variations, or improvements therein may be subsequently made by those skilled in the art, which are also intended to be encompassed by the following claims.

What is claimed is:

1. A system for adjusting at least one operational parameter for at least one electrical energy consuming device comprising:
    a communication port configured to receive electrical energy consumption measurements for operational activity periods from a plurality of printing devices; and
    a controller communicatively connected to the communication port to receive the electrical energy consumption measurements for operational activity periods from each printing device communicatively connected to the communication port, the controller being configured to identify an electrical energy consumption measurement difference between an electrical energy consumption measurement for an operational activity period that was received from a first printing device that ejects a first type of ink and an electrical energy consumption measurement for a corresponding operational activity period for a second printing device that ejects a second type of ink that is different than the first type of ink, the electrical energy consumption measurement being stored in a memory communicatively connected to the controller, and the controller being configured to modify an operational parameter for the first printing device in response to the difference being greater than a predetermined threshold and to communicate the modified operational parameter to the first printing device through the communication port to enable modified operation of the first printing device.

2. The system of claim 1, the communication port further comprising:
    a network interface communicatively connected to the controller and to the plurality of printing devices.

3. The system of claim 1, the communication port further comprising:
    a memory device interface configured to connect operatively to a memory device to receive at least one electrical energy consumption measurement for an operational activity period that was stored in the memory device by the first printing device.

4. The system of claim 1 further comprising:
    a database configured to store a plurality of electrical energy consumption measurements for operational activity periods, the database being communicatively connected to the controller to enable the controller to retrieve an electrical energy consumption measurement for an operational activity period that corresponds to the operational activity period for the electrical energy consumption measurement received from the first printing device.

5. The system of claim 1, the operational parameter adjusted for the first printing device is an operational cost parameter.

6. The system of claim 5, the controller being further configured to adjust an operational cost parameter of one of the printing devices by an amount corresponding to the identified difference.

7. The system of claim 1 wherein the first type of ink is solid ink and the second type of ink is aqueous ink.

8. The system of claim 7 wherein the operational activity period is a count of media sheets printed by the printing device that ejects aqueous ink during a predetermined period of time.

9. The system of claim 7 wherein the operational activity period is a measurement of a quantity of colorant consumed by the printing device that ejects aqueous ink during a predetermined period of time.

* * * * *